April 29, 1969 F. L. MONOHAN 3,441,909

MAGNETIC MEMORY SYSTEM

Filed April 21, 1966 Sheet 1 of 7

FRANKLIN L. MONOHAN
INVENTOR.
BY Seed & Berry
ATTORNEYS

FRANKLIN L. MONOHAN
INVENTOR.
BY Seed & Berry
ATTORNEYS

FRANKLIN L. MONOHAN
INVENTOR.
BY Seed & Berry
ATTORNEYS

FRANKLIN L. MONOHAN
INVENTOR.

BY Seed & Berry

ATTORNEYS

FRANKLIN L. MONOHAN
INVENTOR.

BY Seed & Berry

ATTORNEYS

FRANKLIN L. MONOHAN
INVENTOR.
BY Seed & Berry
ATTORNEYS

FRANKLIN L. MONOHAN
INVENTOR.
BY [signature]
ATTORNEYS

United States Patent Office 3,441,909
Patented Apr. 29, 1969

3,441,909
MAGNETIC MEMORY SYSTEM
Franklin L. Monohan, 6814 SW. 32nd St., Mercer Island, Wash. 98040
Filed Apr. 21, 1966, Ser. No. 544,260
Int. Cl. G06f 7/06
U.S. Cl. 340—172.5 15 Claims

ABSTRACT OF THE DISCLOSURE

A control system comprises a drum provided with endless magnetizable tracks and is rotatably journalled to a base and encircled by a support rail. The support rail mounts magnetic write heads for imposing a magnetic code on the tracks, read out switches actuatable by the magnetic code, and erase heads for removing the magnetic code. The read out switches are carried by switch circuit blocks adapted to be clamped onto the support rail at any locus required to correspond with the locus of the controlled positions of the device to be controlled.

This invention relates to programmed controllers and more particularly to such controllers having a memory drum control mechanism that moves in synchronism with the object to be controlled.

A primary object of the invention is to provide a control system employing a memory drum having endless magnetizable paths for carrying a programmed magnetic code. Another object is to provide such a system wherein the read out means are compact and positive acting. These and other objects and advantages of the invention will become apparent from the following description taken in conjunction with the accompanying drawings, of which:

The system of this invention (1) imposes a code of magnetic signals on multiple paths moving in synchronism with a conveyor, machine tool, or other device which requires programmed control, and (2) controls the operation of such device according to the dictate of the imposed code. The code is physically manifested by regions or spots of magnetic flux on the paths. The principal components of the system comprise a rotatable drum mechanism having a plurality of circumferential endless magnetizable tracks, at least one mechanism for writing a magnetic code on the tracks, at least one mechanism for reading out the magnetic code on the tracks, and at least one mechanism for erasing the magnetic code from the tracks, and at least one mechanism for erasing the magnetic code from the tracks after it has been "read out." A code is produced on the tracks by means of U-shaped electro-magnet write heads energized by brief pulses of direct current. Each time the write heads are pulsed, signals in the form of magnetic north and south poles are produced on the tracks with an orientation, or polarity, perpendicular to the drum axis of rotation. Code signals are removed from the tracks by electromagnet erase heads which are energized by continuous alternating current or pulsating direct current. The read out mechanisms are located along the magnetizable paths at positions corresponding to positions at which a programmed function is to be performed.

Figure 2:
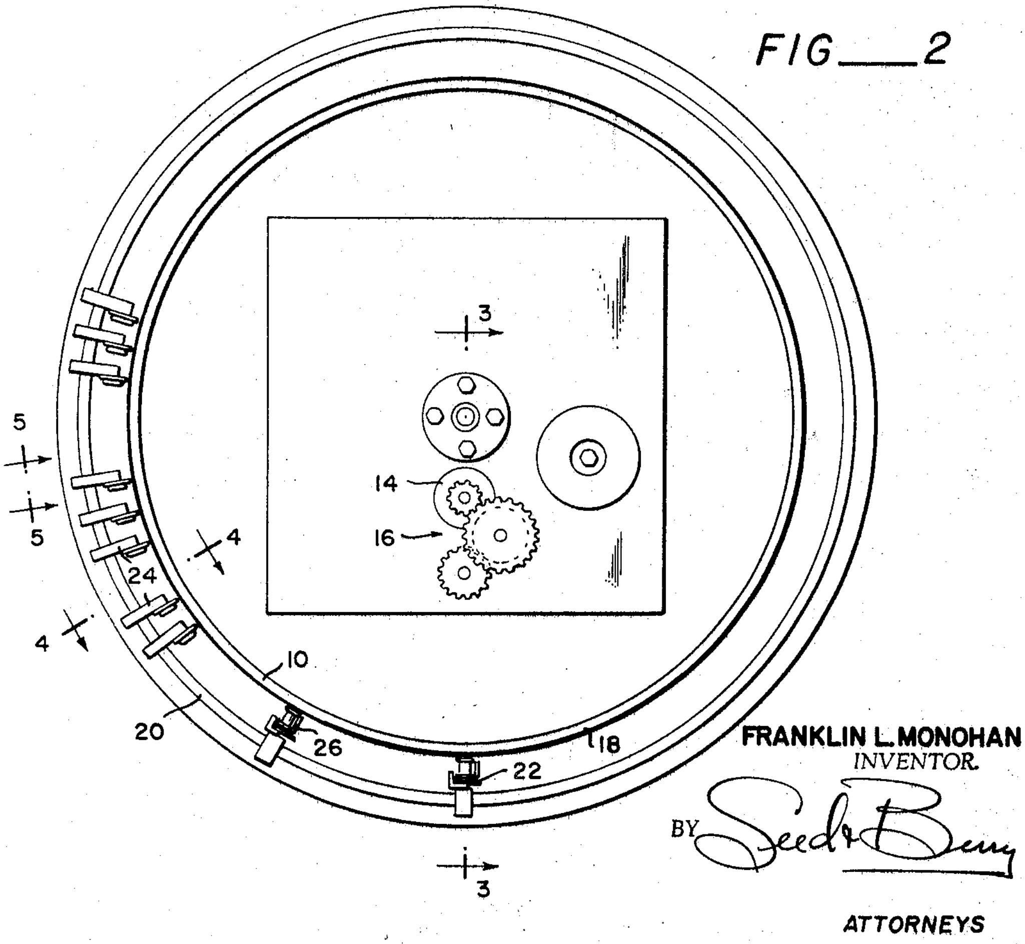
FIG. 2 is a top plan view of an exemplary control mechanism of this invention.
Figure 3:
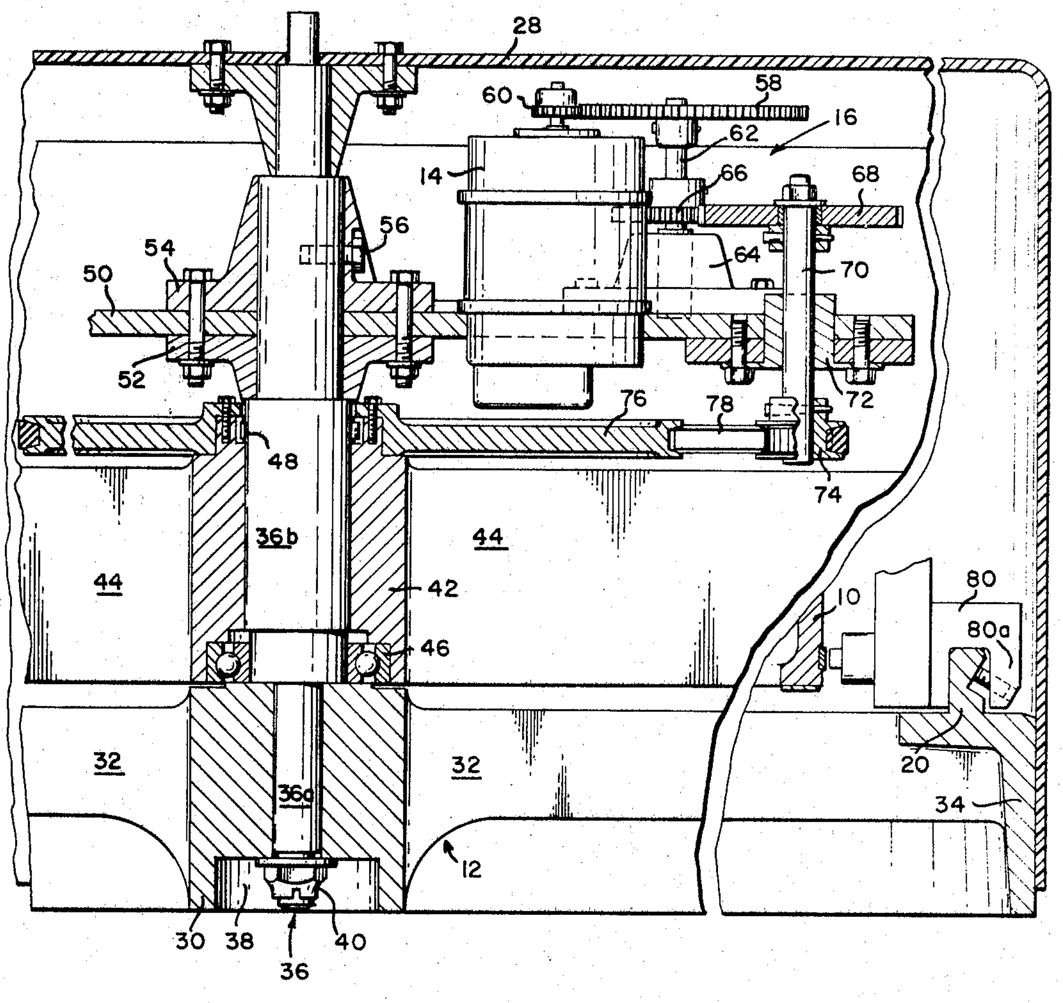
FIG. 3 is a cross-section taken along the line 3—3 of FIG. 1 which illustrates features of this invention.

With reference to FIGS. 2 and 3, the rotatable drum assembly of this invention comprises a cylindrical member or drum 10 rotatably journaled to a base member 12 and driven by motor 14 through a gear mechanism 16. Drum 10 is provided on its outer peripheral surface with a plurality of circumferential grooves which are each adapted to receive and retain a magnetizable track member 18 in the form of a circumferential band that encircles the drum's outer peripheral surface. A circumferential support rail 20 is provided on which write means 22, read out means 24 and erase means 26 are mounted adjacent to the drum's outer peripheral surface. An outer cover 28 may be provided to enclose the entire assembly if desired.

Base member 12 comprises a lower journal support 30 with radially extending web members 32 which join journal support 30 to a circumferential inverted L-shaped base support 34 for support rail 20. Journal support 30, web members 32, base support 34 and support rail 20 may be cast in one piece or in several combined sections or may be provided as individual elements and welded or bolted together. Journal support 30 is provided with a bore suitable for receiving the lower portion 36*a* of a fixed shaft 36 and with a larger bore 38 providing sufficient space for attaching nut 40 to the threaded lower end of shaft 36.

Drum 10 is journal mounted to base member 12 through upper journal support 42. Drum 10 is joined to journal support 42 by radially extending web members 44 which may be cast with journal support 42 as one piece is desired or be welded or bolted to journal support 42. Journal support 42 is provided with a bore suitable for receiving a lower intermediate portion 36*b* of shaft 36 that is larger than the shaft lower portion 36*a*. This lower intermediate portion of shaft 36 is seated on the inner surface of lower journal support 30 and is rotatably journaled to upper journal support 42 at their respective lower ends by ball bearing assembly 46 and at their respective upper ends by roller bearing assembly 48. Journal support 42 is thus freely rotatable with respect to shaft 36 and lower journal support 30.

Motor 14 and gear assembly 16 are supported from an upper intermediate section 36*c* of shaft 26 by a plate member 50. Plate member 50 is bolted between two flange members 52 and 54, and flange member 54 is keyed to the shaft upper intermediate section by pin 56. The upper intermediate section of shaft 36 is smaller than its lower intermediate section and the annular face between the two intermediate sections is provided to support flange member 52.

Gear assembly 16 comprises a first gear 58 which is driven by drive gear 60 on the output shaft of motor 14. The first gear 58 is mounted on a shaft 62 which is rotatably journalled to plate member 50 by flange member 64. A second gear 66 is mounted on an intermediate section of shaft 62 and drives a third gear 68 mounted on one end of shaft 70. Shaft 70 is rotatably journalled to plate member 50 by flange member 72 and a belt drive pulley 74 is mounted on its other end. A belt driven pulley 76 is mounted on upper journal support 42 in fixed relation thereto and is rotated by pulley 74 through belt 78.

Figure 8:
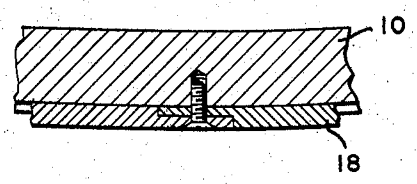
FIG. 8 is a detail view in cross section illustrating an exemplary magnetizable track member of this invention.

The width and diameter of drum 10 is determined in each application of the system by the number of tracks and the circumferential length of the tracks required to control the operation. In general, complicated applications will require the use of more tracks with greater circumferential length than less complicated applications. Each of these track members comprises a band of magnetizable material, set into a groove provided therefor in the drum outer peripheral surface, which completely encircles the drum outer peripheral surface. The ends of each band may abut but preferably overlap in a lap joint as shown in FIG. 8 and are preferably pinned together and to the cylindrical member at the joint as also shown in FIG. 8.

A preferred track member material is Cunife, which is a magnet alloy with a composition of 60% copper, 20% nickel and 20% iron. This alloy is strong, ductile and malleable and can be readily stamped, machined or otherwise formed by conventional methods into a circumferential band. This alloy has a magnetic strength comparable to common grades of Alnico magnet alloys but is more malleable and neither as hard nor as brittle as Alnico alloys.

Write means 22, read out means 24 and erase means 26 are preferably each attached to yoke members 80 which fit over support rail 20 and are connected thereto by set screws. The outer side of support rail 20 is preferably undercut to provide a surface slanted downwardly and inwardly against which the yoke set screws may abut when threaded upwardly through the outer legs 80*a* of the yokes as shown in FIG. 3. The yoke members for write means 22 and erase means 26 are preferably thicker than the read out means yoke members because the former are somewhat heavier and thus more difficult to support than the read out means.

Figures 9, 10, 11, 12, 13:
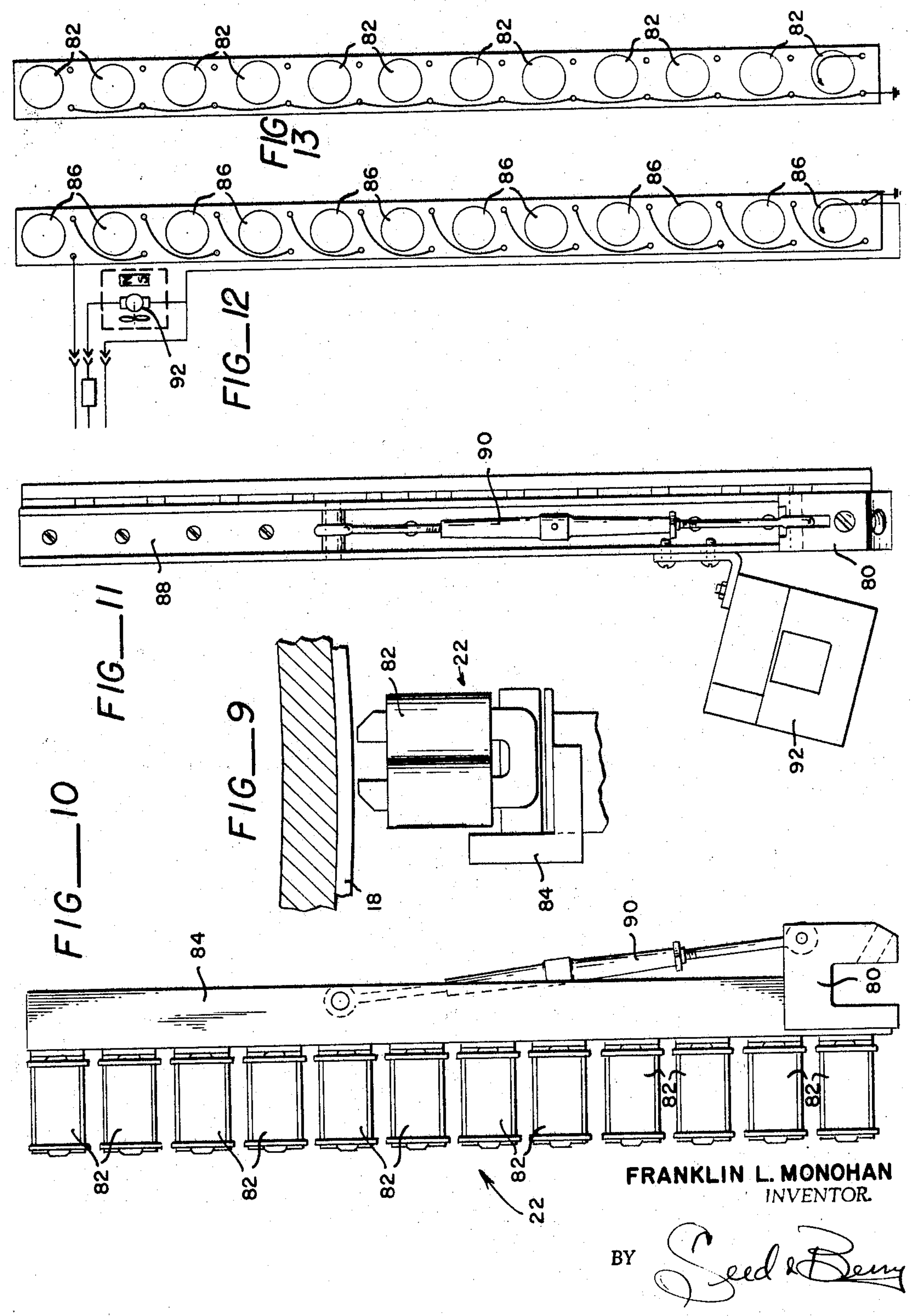
FIG. 9 is a detail plan view in partial cross section illustrating an exemplary means for writing a magnetic code on magnetizable track members.
FIG. 10 is a side elevation view of exemplary means for imposing or for erasing a magnetic code from magnetizable track members.
FIG. 11 is an edge elevation view of the means shown in FIG. 9.
FIG. 12 is an exemplary wiring diagram of means of erasing a magnetic code from magnetizable track members.
FIG. 13 is an exemplary wiring diagram of means for imposing a magnetic code on magnetizable track members.

FIGS. 9 and 10 show a preferred write means 22 comprising a plurality of U-shaped electromagnets 82, one adjacent each track member 18 and supported by an angle member 84. Angle member 84 is supported at its lower end by yoke member 80, which is welded thereto, parallel to the outer peripheral surface of cylindrical member 10. Electromagnets 82 are wired such that a north pole is superimposed ahead of a south pole with respect to the direction of rotation of drum 10 as shown in FIG. 13. This polarity is not critical but merely preferred as a convention to aid in servicing the electrical components of the system.

FIGS. 11 and 12 show a preferred erase means 26 as comprising a plurality of electromagnets 86, one adjacent each track member 18 and supported by a channel-shaped member 88. The base of channel-shaped member 88 faces the outer peripheral surface of cylindrical member 10 and is parallel therewith. The lower end of channel-shaped member 88 is attached to yoke member 80. A threadably-adjustable brace member 90 is preferably attached to yoke member 80 and to an intermediate section of channel-shaped member 88 to provide further support to insure that channel-shaped member 88 will remain substantially parallel to the outer peripheral surface of cylindrical member 10 during operation of the electromagnets 86. A blower 92 is also mounted on one side of channel-shaped member 88 and positioned to blow cool air against the electromagnets 86 to dissipate heat generated during their operation.

Figure 6:
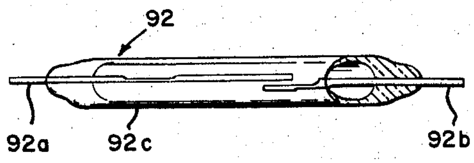
FIG. 6 is an exemplary view in cross section illustrating a reed switch that may be employed in this invention.
Figure 14:
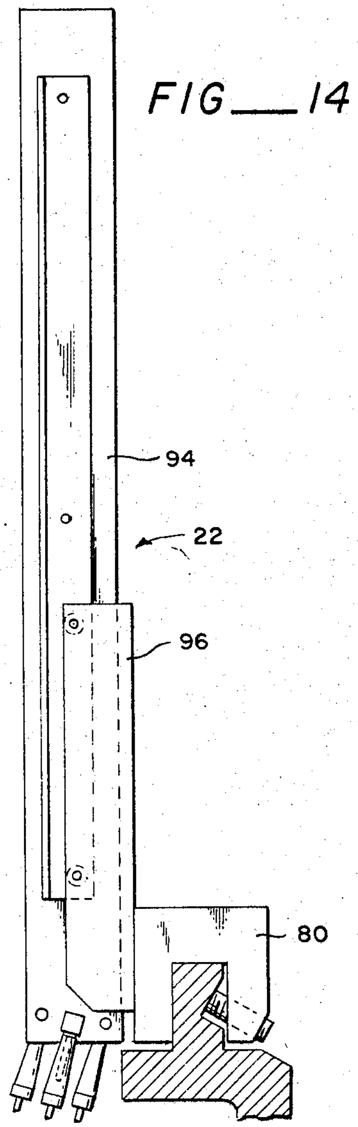
FIG. 14 is a side elevation view of exemplary means for reading out a magnetic code from magnetizable track members.
Figure 15:
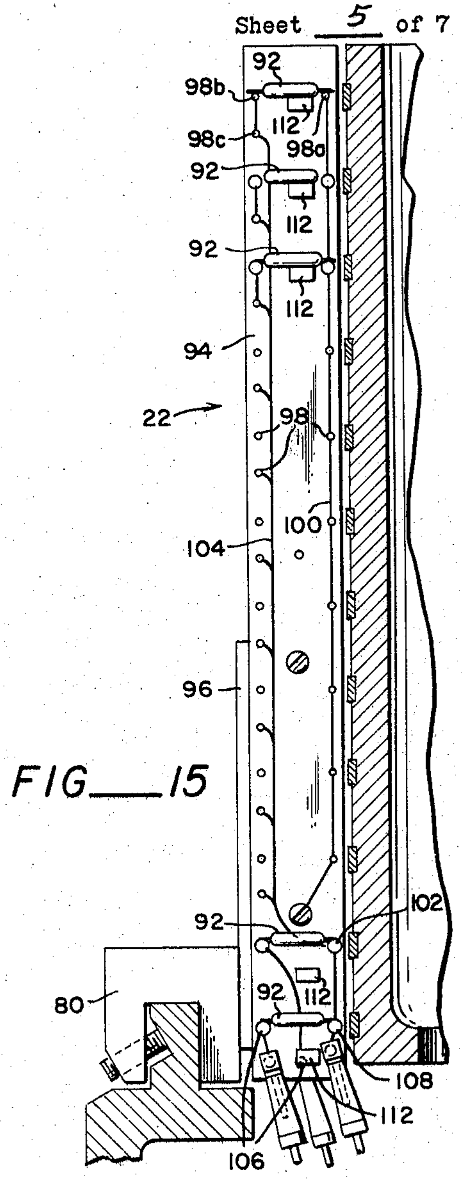
FIG. 15 is an opposite side view of the means shown in FIG. 14 illustrating an exemplary electrical circuit diagram employed with the means.

FIGS. 14 and 15 show a preferred read out means 22 comprising a plurality of dry reed switches 92 mounted on a switch block 94. Switch block 94 is connected to yoke member 80 by means of support plate 96. The dry reed switches are aligned perpendicular to the outer peripheral surface of drum 10, each adjacent to one of the track members 18. Each dry reed switch is also aligned such that the north pole of a passing signal on the adjacent track member will tend to close the switch and such that the south pole of a passing signal will tend to open the switch. As shown in greater detail in FIG. 6, each dry reed switch preferably comprises a pair of low reluctance, magnetically actuated flat metal reeds 92*a* and 92*b*, hermetically sealed within a glass tube 92*c* in an atmosphere of dry inert gas. The glass tube is specially treated and cleaned. The metal reeds are precisely swedged, gold plated and heat treated.

The switch blocks 94 are provided with a plurality of contact sets 98, one set for each of the adjacent track members, to which dry reed switches may be connected. Each set comprises at least two pin-type connectors 98*a* and 98*b* to which dry reed switches can be electrically connected perpendicular to adjacent track members. A third pin-type connector 98*c* may be provided to connect to one of the metal reed ends.

A preferred circuit on each switch block as shown in FIG. 15 comprises interconnecting the dry reed switches in parallel with one leg of each reed switch grounded to the base member 12 through support plate 96 and yoke member 80 by a thin film conductor 100, and with the other leg of each switch connected to an output terminal 102 by a thin film conductor 104. The output terminal 102 may be directly connected to a device that is to be controlled, or may be connected to one or more such devices through one or more dry reed switches and one or more output conductors 106 as shown in FIG. 15. An input terminal 108 is connected to conductor 104. The input terminals and conductors leading to the output terminal are connected to plug jacks so that the entire switch block can be disconnected and removed from the system as required.

Figure 16:
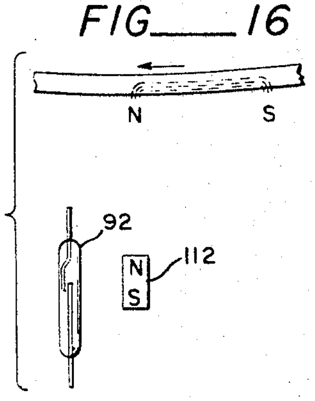
FIGS. 16 and 17 illustrate an exemplary operation of the FIG. 6 switch in a normally open and a normally closed condition, respectively.
Figure 17:
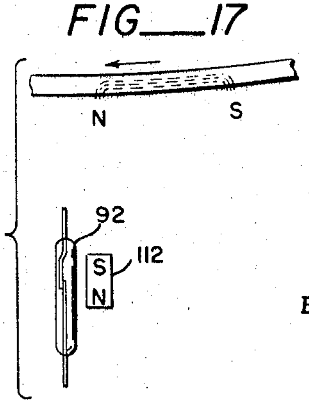

The dry reed switches are fast-acting and usually make and break contact rapidly under the influence of the north and south poles of the signals on the adjacent track members. Occasionally, however, a dry reed switch may stick and thereby disrupt the operation of the system. Therefore, permanent bias magnets having a magnetic strength somewhat less than the strength of the track signals are preferably positioned adjacent to each dry reed switch with their north-south axis parallel with the dry reed switches and perpendicular to the adjacent track members as shown in FIGS. 15, 16 and 17.

For a normally-open switch, a bias magnet 112 is positioned adjacent the reed switch air gap with its north pole adjacent the track member. The bias magnet is positioned sufficiently close to the reed switch that the effect of the bias magnet is to slightly influence the switch by circulating flux through the switch but yet not close the switch. When the signal north pole on the track member passes in proximity to the switch, the addition of the north flux from the track signal to the north flux of the bias magnet provides enough total flux to close the switch. When the signal south pole passes in proximity to the switch, the south flux cancels (neutralizes) the flux from the bias magnet north pole and forces the switch back to the open position.

For a normally-closed switch, the bias magnet is positioned adjacent the reed switch air gap with its south pole adjacent the track member. The bias magnet is positioned sufficiently close to the switch to maintain the switch contact in a normally closed condition. When the north pole of the track signal passes in proximity to the switch, the north flux of the track signal cancels the south flux of the bias magnet and forces the switch to open. When the signal south pole passes in proximity to the switch, the south flux of the signal adds to the south flux of the bias magnet and closes the switch.

Reinforcing the flux from the track signal in the above-described manner by properly orienting and positioning the bias magnet insures that a switch will open and close positively regardless of any tendency of the switch to stick.

Figure 1:
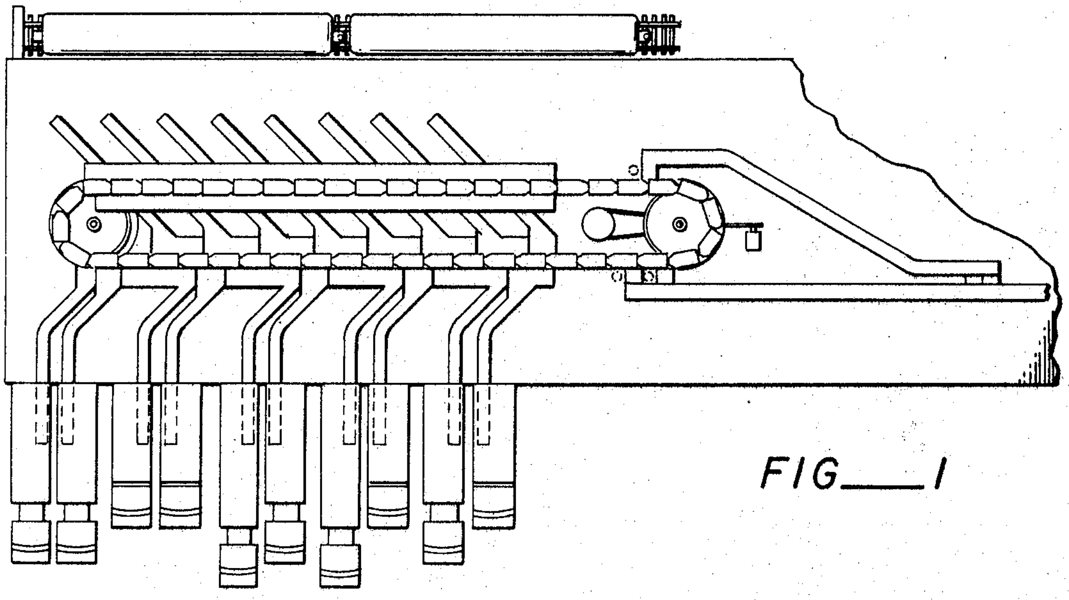
FIG. 1 illustrates a conveyor device which may be controlled by the system of this invention.
Figure 18:
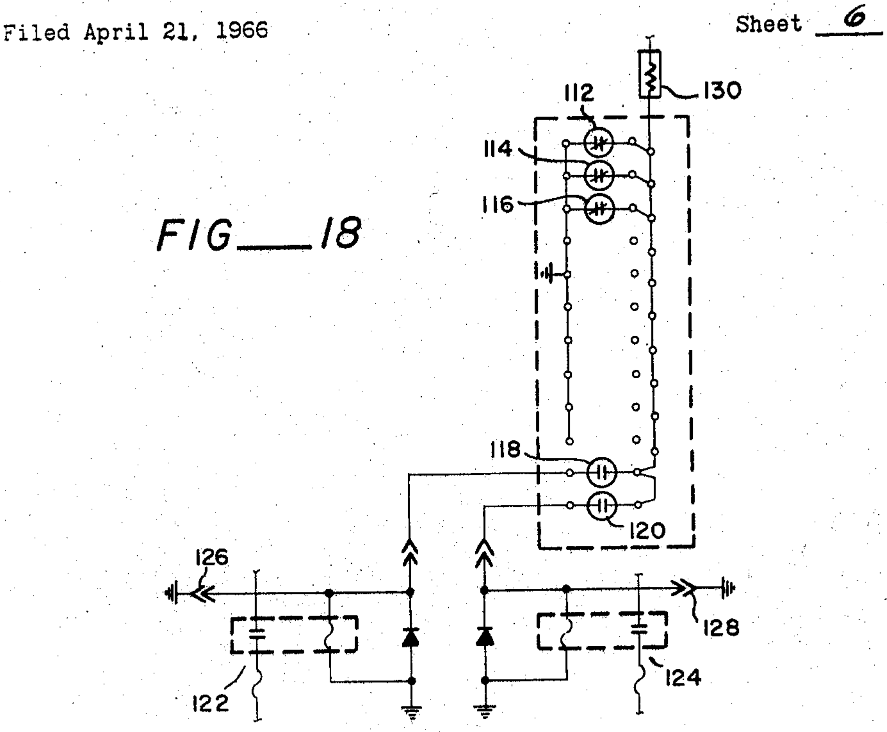
FIG. 18 illustrates an exemplary reed switch block circuit that could be employed in the operation of the FIG. 1 conveyor device.

With reference to FIGS. 1 and 18, an exemplary operation of the system of this invention would be to control the operation of a loading terminal wherein material to be loaded is conveyed to various points where it is to be deflected, or dumped, to a highway van on the left or to a railroad car on the right. For each pair of left and right hand dump mechanisms, a reed switch block would be used to control their operation. A typical reed block switch circuit for one pair of dump mechanisms might be as appears in FIG. 14, wherein three normally closed reed switches 112, 114 and 116 respectively are positioned adjacent to the upper three track members of a twelve track system, and two normally open reed switches 118 and 120 are positioned adjacent to the lower two track members. Switches 112, 114 and 116 are code switches and the electromagnets of the system write means must be programmed to simultaneously produce signals on the upper three track members so that all three code switches will simultaneously open to disconnect the reed switch block circuit from ground. Switches 118 and 120 are left and right hand dump control switches, respectively, and, depending on whether material is to be dumped to the left or to the right, the system write means must also be programmed to produce a signal on the respective one of the two lower track members to close one of the dump switches simultaneously with the opening of the code switches. If, for example, left hand dump switch 118 is closed, a solenoid 122 controlling the left hand dump mechanism will be actuated and the material dumped to a highway van. Likewise, if right hand dump switch 120 is closed, a solenoid 124 controlling the right hand dump mechanism will be actuated and the material dumped to a railroad car. Each dump mechanism may be provided with a switch or control jack, 126 and 128 respectively, to enable an operator to manually inactivate the reed switch block circuit by grounding should material become jammed in the dumping mechanism. A load resistor 130 is preferably connected to the power input terminal of the reed switch block circuit so that the voltage drop across the load resistor is such that only one dump mechanism can be operated but not both at one time. Thus, if an operator accidentally programs the system write means to close both switches 118 and 120, there will be insufficient power to actuate either dump mechanism. Each of the dump mechanism pairs will have a corresponding reed switch block with code switches positioned such that only one set of signals on the track members will open all of the code switches on a particular switch block.

The electrical operation of the exemplary reed block of FIG. 18 is described as follows: Normally the load side of the resistor is grounded through the code switches to the frame of the block. Under this condition there can be no voltage transmitted to the dump contactors. When the proper code appears on the drum tracks, the reed block switches are opened and the ground is removed from the load resistor. At the same time either the left or the right hand switch will close also, directing the block voltage to one or the other of a pair of dump contactors. When the contactor closes, power is applied to the dumping solenoid. There are also dump control grounding jacks located at each chute position. If this jack is plugged in then the contactor coil is effectively shorted to ground and the slide is therefore disabled because of the voltage drop across the load resistor.

Multiple magnetic paths provide the coding ability which permits a large number of sorts to be controlled by relatively few magnetic paths. The coded signals are carried past a succession of reed switch blocks until the proper code is recognized by the particular arrangement of read switches at the proper sorting station. As the signals reach the full travel of the magnetic paths (corresponding to the full travel of the sorting machine from first input station past the last output station), the magnetic signals are erased, leaving the path clear for the new magnetic signals to be imposed.

A unique aspect of the invention is that absolutely no electronics, amplifiers, transistors or reactors are needed to amplify the magnetic signal to a usable form. The magnetic pulse imposed on the drum track is strong enough to be physically detected with any piece of ferrous metal, such as a nail or screwdriver. Other than the reed switch, which has a life rating of 20,000,000 operations, the system has no other wearing parts. The basic components of the system can be rated as having indefinite life regardless of the number of operations. Average industrial electricians have no trouble understanding all functions of the system after approximately 30 minutes of study, and for this reason, maintenance and upkeep on the system can be easily performed without special technical training or tools.

The proper coding number for each item is entered into the system by a keyboard operator. The entry can be made at any time during the passage of one sack, parcel or object through the marked selection area. The coding information is held in a register until the object is just leaving the selection area. At that moment, the system will actuate one or more of the write heads to impose the proper magnetic coding signals on one or more of the drum tracks. The magnetic pulse on the tracks is rotated slowly in synchronism with the selected object moving down the conveyor line.

Figure 19:
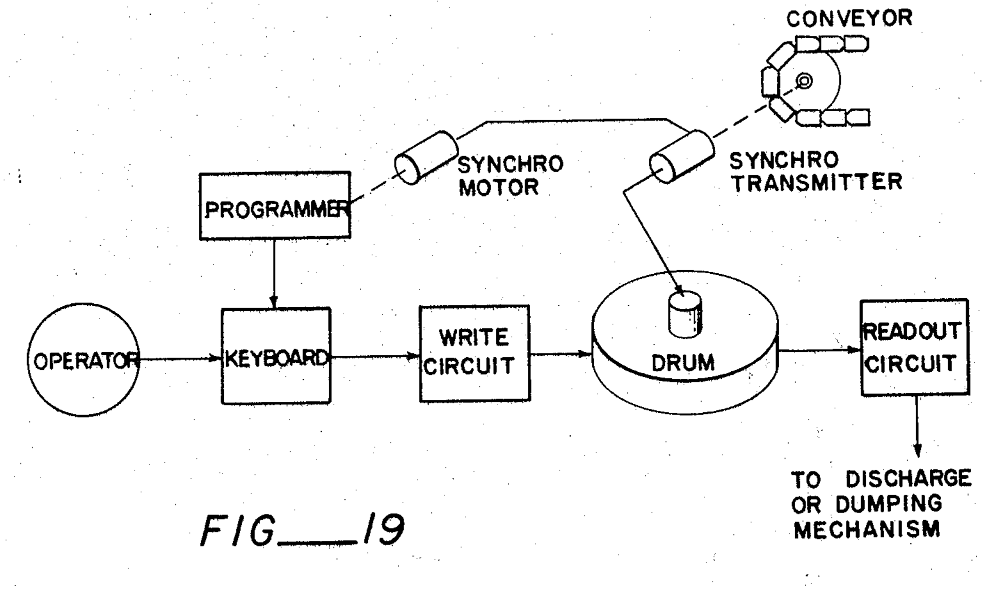
FIG. 19 is a schematic diagram of an exemplary complete control system of this invention.
Figure 20:
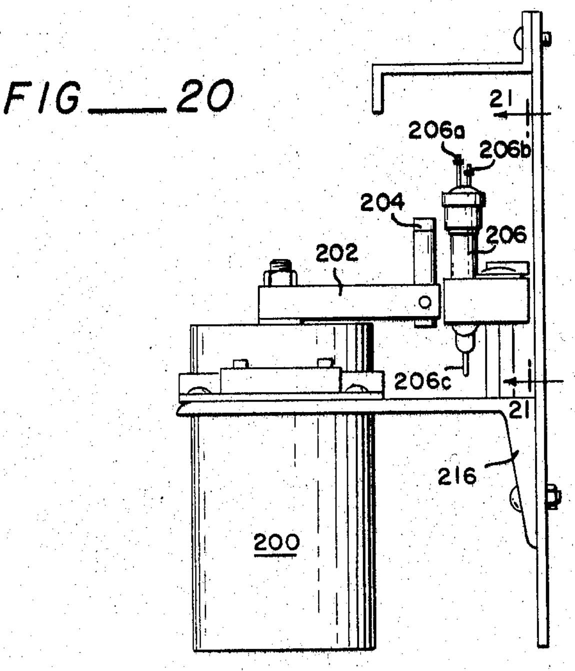
FIG. 20 is a side elevation view of the keyboard programmer of FIG. 18.
Figure 21:
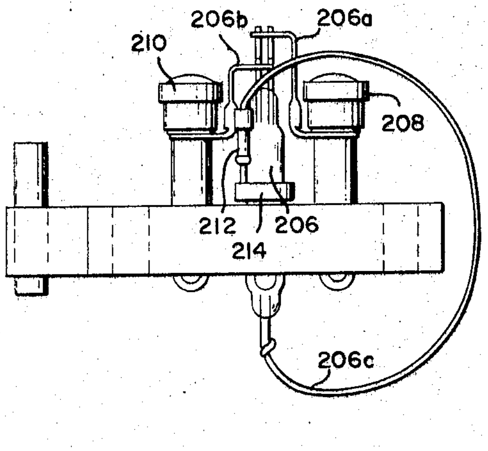
FIG. 21 is a front elevation view of a section of the programmer shown in FIG. 19.

As shown in FIG. 19, a synchro-transmitter or generator is connected to one of the conveyor rollers and electrically transmits such rotation to the drum synchro motor so that the drum will rotate in synchronism with the conveyor. The synchro-transmitter also transmits such rotation to a programmer synchro-motor through a suitable gear reduction mechanism (not shown). This programmer clears the keyboard whenever the conveyor advances a predetermined distance equal to the spacing of a package so that the keyboard is ready to enter the proper coding number for the next package. FIGS. 20 and 21 show the programmer in detail.

The programmer comprises a synchro-motor 200, a scanner bar 202 rotatably connected to the motor output, a permanent magnet 204 attached to the outer end of the scanner bar, and a double-acting wet reed switch 206 having a normally closed position and an open position. The switch 206 is wired such that when opened the keyboard is reset and such that the switch is opened when the magnet 204 is rotated in close proximity thereto as shown in FIG. 20. The synchro-motor rotates the scanner bar and magnet 360° for every package space advance of the conveyor. The reset period, i.e. the period when the switch 206 is open, is about 10° to 15° of the scanner bar arc.

The top fixed switch conductors **206*a* and 206*b* are attached to threaded binding posts 208 and 210 and the bottom flexible switch conductor 206*c* is attached by means of a jack 212 to a power input block 214. The binding post 208 connects the programmer to the normally closed switch terminal 206*a*. This type of switch assembly permits convenient removal and replacement of the switch 206**.

The programmer components described above are preferably mounted on a framework comprising an angle member 216. Member 216 may be mounted remotely from the conveyor at any convenient location, for example within the drum.

At the proper point around the circumference of the drum, a group of reed switches is stationed corresponding to each of the sorting stations. Each of the read switches is wired either in normally-open or normally-closed positions in accordance with the proper code arrangement for that particular sorting station. With all of the switches wired in series, the proper code for that station will actuate all of the normally-open switches to the closed position. Conversely, the absence of any conflicting magnetic impulse will leave all of the normally-closed switches in the closed position so that a complete electrical path will be available through the series read switches when the proper code is recognized for that station. This technique, commonly used in computer and logic system controls, is referred to as binary to decimal de-coding.

Figure 4:
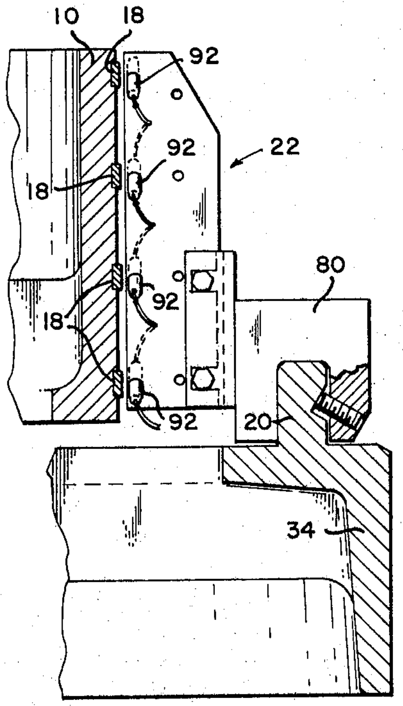
FIG. 4 is a side elevation view illustrating an exemplary means for reading out a code from magnetizable track members.
Figure 5:
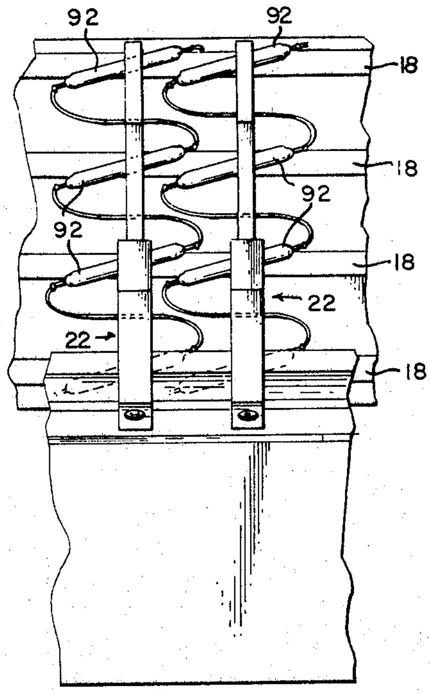
FIG. 5 is an end elevation view of FIG. 4.
Figure 7:
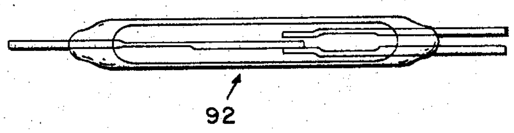
FIG. 7 is an exemplary view in cross section illustrating another reed switch that may be employed in this invention.

For certain applications, it may be desired to mount the dry reed switches parallel to the drum tracks as shown in FIGS. 4 and 5. It may also be desired to electrically connect the dry reed switches in series as shown in FIGS. 4 and 5 rather than in parallel. A parallel arrangement is preferred however because a simplified programming technique can be employed to impose and read out a magnetic code. Also, for certain applications, it may be desired to use double-acting dry reed switches as shown in FIG. 7 which have both normally closed and normally open contacts.

It should be noted that on any particular reed switch block, one or more of the switches could be normally open, and one or more switches could be normally closed. It is also to be noted that there exist various methods for programming the system of this invention and that various reed switch block circuit configurations could be employed to read out codes produced by such programming methods.

What is claimed is:

1. A control system which comprises rotatable means provided with a plurality of endless magnetizable track members; a base to which said drum it rotatably journalled; a support rail on said base encircling said rotatable means; writing means for imposing a coded magnetic signal on said track members; read out switch means including switch mounting means connectable to said encircling support rail at any desired locus and extending longitudinally of said rotatable means, and a plurality of switches actuatable by said code and carried by said switch mounting means with each switch being in proximity to one of said track members; and erase means for removing said code.

2. A control system according to claim 1 wherein said rotatable means comprises a drum having an outer peripheral surface; and wherein said endless magnetizable track members are provided in the form of bands encircling the drum outer peripheral surface.

3. A control system according to claim 2 wherein said switch mounting means comprises a switch circuit block to which said switches are electrically connected, and a yoke member adapted to be inserted over and bound to said support rail.

4. A control system according to claim 2 wherein said drum outer peripheral surface is provided with circumferential grooves adapted to receive and retain said track members.

5. A control system comprising rotatable means provided with a plurality of endless magnetizable track members; writing means for imposing a coded magnetic signal on said track members which comprise a plurality of electromagnets, each positioned adjacent a track member and adapted to impose closely spaced regions of oppositely poled concentrated magnetic flux on the respective adjacent track members with an orientation perpendicular to the rotatable means axis of rotation; read out switch means actuatable by said code; and erase means for removing said code.

6. A control system according to claim 5 wherein said read out switch means comprises a plurality of reed switches, each positioned adjacent a track member and adapted to be opened by a concentrated magnetic flux region of one polarity on the respective adjacent track member and adapted to be closed by a concentrated magnetic flux region of opposite polarity on the respective adjacent track member.

7. A control system according to claim 6 wherein said read out switch means include a plurality of permanent bias magnets positioned adjacent said reed switches to ensure positive opening and closing of said reed switches in response to passage of regions of concentrated magnetic flux on the respective adjacent track members.

8. A control system according to claim 6 wherein said read switches are oriented perpendicular to said track members.

9. A control system according to claim 6 including a support rail encircling said rotatable means; and wherein said read out switch means comprises a yoke member adapted to engage said support rail, a switch block connected to said yoke member and having a plurality of sets of electrical contacts with each set aligned with a respective track member; and said read switches are connected to said electrical contacts with their longitudinal axes perpendicular to the respective adjacent track member.

10. A control system according to claim 6 wherein at least one of said read switches is electrically connected in series with an electrical input and an electrical ground and wherein at least one of said read switches is electrically connected in series with said electrical input and electrical output.

11. A control system according to claim 1 wherein said erase means comprises a support member, a plurality of electromagnets mounted on said support member, a yoke member connected to said support member and adapted to engage said support rail, a threadably-adjustable brace member attached to said yoke member and to said support member, and a blower positioned to cool said electromagnets during operation of said erase means.

12. A control system according to claim 1 wherein the magnetizable track members are fabricated from a magnet alloy having a composition of 60% copper, 20% nickel and 20% iron.

13. A control system for controlling conveying means which comprises rotatable means provided with a plurality of endless magnetizable track members; writing means for imposing a coded magnetic signal on said track members; read out switch means actuatable by said means code to pass control signals to a conveyor means; erase means for removing said code; programming means for programming said writing means; and means for clearing said programming means whenever said conveyor means advances a predetermined distance.

14. A control system according to claim 13 wherein the clearing means comprises rotatable magnet means adapted to rotate 360° as said conveyor means advances a predetermined distance; reed switch means positioned in proximity to said magnet means for actuation by said magnet means once every 360°, said reed switch means being electrically connected to said clearing means to actuate said clearing means whenever said conveyor means advances a predetermined distance.

15. A method of controlling a device which comprises imposing magnetic code signals on mutually continuously revolving endless magnetizable track members, each such signal comprising magnetic north and south pole flux concentrations; passing said magnetic code signals past read-out switch means and activating said switch means by one of such flux concentrations and inactivating said switch means by the other of said flux concentrations; and removing said magnetic code signals from said track members.

References Cited

UNITED STATES PATENTS

| | | | |
|---|---|---|---|
| 3,356,909 | 12/1967 | Polasek | 317—137 |
| 3,337,852 | 8/1967 | Lee et al. | 340—172.5 |
| 3,293,636 | 12/1966 | Dunne | 340—347 |
| 3,251,961 | 5/1966 | Wintriss | 200—87 |
| 3,233,060 | 2/1966 | Wintriss | 200—87 |
| 3,228,009 | 1/1966 | Wolf | 340—173 |
| 3,228,007 | 1/1966 | Dirks | 340—172.5 |
| 3,210,498 | 10/1965 | Jackson et al. | 200—87 |
| 3,009,759 | 11/1961 | Johnson et al. | 346—74 |
| 2,969,525 | 1/1961 | Hill | 340—174.1 |
| 2,926,298 | 2/1960 | Newhouse | 323—50 |
| 2,927,305 | 3/1960 | Wright et al. | 340—174 |
| 2,770,796 | 11/1956 | Boer | 340—174 |
| 2,912,678 | 11/1959 | Robinson et al. | 340—174 |

GARETH D. SHAW, *Primary Examiner.*

U.S. Cl. X.R.

340—174.1